(12) United States Patent
Kargenian

(10) Patent No.: US 7,867,536 B2
(45) Date of Patent: Jan. 11, 2011

(54) METHOD FOR PRODUCING AN EDIBLE SAUSAGE-LIKE FOOD PRODUCT

(76) Inventor: John H. Kargenian, 212 Anthony Rd., Buffalo Grove, IL (US) 60089

( * ) Notice: Subject to any disclaimer, the term of this patent is extended or adjusted under 35 U.S.C. 154(b) by 1435 days.

(21) Appl. No.: 11/195,054

(22) Filed: Aug. 2, 2005

(65) Prior Publication Data

US 2007/0031541 A1    Feb. 8, 2007

(51) Int. Cl.
*A21D 13/00* (2006.01)
*A22C 11/00* (2006.01)

(52) U.S. Cl. .......................... 426/283; 426/89; 426/90; 426/92; 426/282; 426/512; 426/665

(58) Field of Classification Search .................. 426/89, 426/90, 92, 283, 282, 284, 513, 512, 665
See application file for complete search history.

(56) References Cited

U.S. PATENT DOCUMENTS

| | | | |
|---|---|---|---|
| 1,569,121 A * | 1/1926 | Hall | 426/138 |
| 2,186,435 A | 1/1940 | Serr | |
| 2,240,522 A | 5/1941 | Serr | |
| 2,359,981 A | 10/1944 | Serr | |
| 2,822,571 A | 2/1958 | Johnson | |
| 2,568,491 A | 9/1961 | Edwards | |
| 3,161,154 A | 12/1964 | Schott | |
| 3,860,728 A * | 1/1975 | Tanner et al. | 426/105 |
| 3,959,503 A | 5/1976 | Laugherty | |
| 4,640,187 A | 2/1987 | Wallick et al. | |
| 4,781,109 A * | 11/1988 | Wiebe et al. | 99/483 |
| 4,834,999 A | 5/1989 | Matthews et al. | |

(Continued)

FOREIGN PATENT DOCUMENTS

JP    63309164 A  *  12/1988

(Continued)

OTHER PUBLICATIONS

Corn Dogs recipe. Recipe courtesy of Alton Brown, 2003. Show: Good Eats. http://www.foodnetwork.com/recipes/alton-brown/corn-dogs-recipe/index.html.*

(Continued)

*Primary Examiner*—David R Sample
*Assistant Examiner*—Brent T O'Hern
(74) *Attorney, Agent, or Firm*—Law Office of John W. Harbst

(57) ABSTRACT

A method for producing an edible product in the form of an elongated sausage having first and second ends. The methodology involves: removing an inner core from the elongated sausage such that, after the inner core is removed therefrom, the sausage defines a blind bore extending along a major length of the sausage, with the blind bore having one end opening to an exterior of the elongated sausage. The process further involves: inserting a specialty filling into the open end of the blind bore until the specialty filling substantially fills the length of the blind bore and such that the filled meat sausage offers multistaged flavor along the length thereof and then, closing the open end of the blind bore with a lengthwise portion of the inner core removed from the sausage or from an inner core of a previously cored sausage.

15 Claims, 2 Drawing Sheets

U.S. PATENT DOCUMENTS

| | | | | |
|---|---|---|---|---|
| 4,847,101 | A | * | 7/1989 | Rubio ........................ 426/282 |
| 4,921,714 | A | | 5/1990 | Matthews et al. |
| 6,200,613 | B1 | * | 3/2001 | Schafer et al. .............. 426/105 |
| 2004/0108332 | A1 | | 6/2004 | Brient et al. |
| 2004/0109924 | A1 | | 6/2004 | Brient |
| 2004/0112928 | A1 | | 6/2004 | Brient |
| 2004/0115320 | A1 | | 6/2004 | Brient |

FOREIGN PATENT DOCUMENTS

| | | | | |
|---|---|---|---|---|
| JP | 01174330 | A | * | 7/1989 |

OTHER PUBLICATIONS

Translated abstract of JP 63309164 A (Dec. 1988), see above.*

* cited by examiner

METHOD FOR PRODUCING AN EDIBLE SAUSAGE-LIKE FOOD PRODUCT

FIELD OF THE INVENTION

The present invention relates to edible food products and, more particularly, to a method for producing an improved edible sausage-like food product.

BACKGROUND OF THE INVENTION

It is common practice to prepare, serve and eat a sausage-like food product individually with rolls or bread in the form of a sandwich. It has been customary to embellish the taste of a sausage-like product by spreading various condiments on the outside thereof or on the roll or bread. The condiments applied on and to the outside of the sausage are typically added at the time the food product is served or eaten.

Very often, however, the selection of condiments is limited. Moreover, it is common for the condiments applied to the sausage to drip off and soil either the hands of the person consuming the product, or the clothes of such person, and frequently the surface on which such person may be seated or the surface on which they are eating. The above problems notwithstanding, many people enjoy the additional and different flavors imparted to such sausages by the addition of various condiments and the like.

Thus, there is a need and continuing desire for an edible sausage-like food product having enhanced flavor from the well-known and accepted forms of sausages, wieners, frankfurters, hot dogs and the like which are known today.

SUMMARY OF THE INVENTION

In view of the above, and in accordance with one aspect, there is provided a method for producing an edible meat product in the form of an elongated meat sausage. According to this aspect, the process involves the steps of: removing an inner meat core from the elongated sausage such that, after the inner core is removed therefrom, the sausage defines a blind bore extending generally coaxial with and along a major length of the sausage, with the blind bore opening to one end of the sausage. The process further includes the step of: inserting a mass of edible material or specialty filling into the open end of the blind bore until the mass of edible material substantially fills the length of the blind bore such that the filled sausage offers multistaged flavor along the length thereof while minimizing any mess on the exterior thereof, and, closing the open end of the blind bore with a lengthwise portion of the inner meat core removed from the sausage or from an inner core of a previously cored sausage.

Preferably, the process further includes the step of: warming or cooking the edible meat product whose inner core is filled with the specialty filling prior to serving the sausage for consumption. In one form, the step of warming the edible meat product is effected using at least one of the following steps: baking; steaming; deep frying; flame broiling; and, boiling.

In one form, the mass of edible material or specialty filling inserted into the blind bore defined by the elongated sausage is comprised of any one or more of the following materials: pork; beef; turkey; bacon; flavored Italian sausage; bread crumbs; water; ham; pepperoni; chili; beans; cheese; tomato; onion, sour kraut; relish; pickle; cucumber; mushroom; olive; avocado; lettuce; potato; ketchup; mustard; mayonnaise; flavored sauce; seafood; egg; cream cheese; salsa; pepper; pineapple; raisin; apple; flavored nuts; spices; and, like ingredients. As such, any desired multistaged flavor can be achieved along a major length of the sausage. According to this aspect, the method for producing an edible meat product further includes the step of: extruding the specialty filling into an edible and flexible outer meat/vegetable casing which wholly encloses and maintains the flavoring of the specialty filling therewithin prior to insertion of the specialty filling into the blind bore defined by the sausage.

According to another aspect, there is provided a method for producing an edible product in the form of an elongated sausage having first and second end portions. According to this aspect, the methodology involves: removing an inner core from said elongated sausage such that, after the inner core is removed therefrom, the sausage defines a blind bore extending along a major length of the sausage, with the blind bore having one end opening to an exterior of the elongated sausage. The process further involves: inserting a mass of edible material or specialty filling into the open end of the blind bore until the mass of edible material substantially fills the length of the blind bore such that the filled sausage offers multistaged flavors along the length of the sausage; and then, closing the open end of the blind bore with a lengthwise portion of the inner core removed from the sausage or from an inner core of a previously cored sausage.

In a preferred form, the blind bore defined by the elongated sausage extends for a distance ranging between about 60% and about 90% of a length measured between the first and second end portions of the elongated sausage. The preferred methodology further includes the step of: warming or cooking the edible sausage whose inner core is filled with the mass of edible material. The step of warming the edible product is preferably accomplished using at least one of the following steps: baking; steaming; deep frying; flame broiling; and, boiling.

The specialty filling or mass of edible product inserted into the blind bore defined by the elongated sausage is comprised of any one or more of the following materials: pork; beef; turkey; bacon; flavored Italian sausage; ham; pepperoni; chili; beans; cheese; tomato; onion, sour kraut; relish; pickle; cucumber; mushroom; olive; avocado; lettuce; potato; ketchup; mustard; mayonnaise; flavored sauce; seafood; egg; cream cheese; salsa; pepper; pineapple; raisin; apple; flavored nuts; spices; and, like ingredients. As such, any desired multistaged flavor can be achieved along a major length of the sausage. Moreover, the method for producing an edible product further includes the step of: extruding the specialty filling into an edible casing which wholly encloses and maintains the flavoring of the specialty filling therewithin prior to insertion of the mass of edible product or specialty filling into the blind bore defined by the sausage.

According to another aspect, there is provided a method for producing an edible meat product in the form of an elongated sausage, comprising the steps of: removing an inner meat core from the elongated sausage such that, after the inner meat core is removed therefrom, the sausage defines a blind bore extending along a major length of the sausage, with the blind bore having one end opening to an exterior of the elongated sausage; and, inserting a mass of edible material into the open end of the blind bore until the mass of edible material substantially fills the length of the blind bore whereby allowing the filled meat sausage to offer a multistaged flavor along the length thereof. According to this aspect, the methodology further includes the steps of: closing the open end of the blind bore with a lengthwise portion of the inner meat core removed from the sausage or from an inner meat core of a previously cored sausage; and dipping the sausage, with the filled and closed blind bore, in a batter whereby covering at least a lengthwise portion of the exterior of the sausage; and then, deep frying the batter dipped sausage.

According to this aspect, the mass of edible material or specialty filling inserted into the blind bore of the sausage is comprised of any one or more of the following materials: pork; beef; turkey; bacon; flavored Italian sausage; ham; pepperoni; chili; beans; cheese, tomato; onion; sour kraut; relish; pickle; cucumber; mushroom; olive; avocado; lettuce; potato; ketchup; mustard; mayonnaise; flavored sauce; seafood; egg; cream cheese; salsa; pepper; pineapple; raisin; apple; flavored nuts; spices; and, like ingredients. In effect, any desired multistaged flavor can be achieved along a major length of the sausage. In one form, the methodology further includes the step of: extruding the mass of edible material into an edible and flexible meat/vegetable outer casing which wholly encloses and maintains the flavoring of the edible material therewithin prior to insertion of the mass of edible material into the blind bore defined by the sausage. The batter into which the sausage is dipped consists of at least one of the following: corn batter; beer batter, and tempura.

One feature of the invention is to improve a sausage-like food product by inserting a fresh, prepared specialty filling into and along a major length of the sausage-like food product to provide a teemed sausage-like edible food product having multistaged flavors along substantially the entire length thereof.

Another feature of the invention is to set forth a method for producing an elongated sausage-like edible food product having a multistaged flavor along a majority of the length thereof.

These and other objects, aims and advantages of the present invention will become even more readily apparent from the following drawings, detailed disclosure and appended claims.

DETAILED DESCRIPTION OF THE INVENTION

Figure 1:
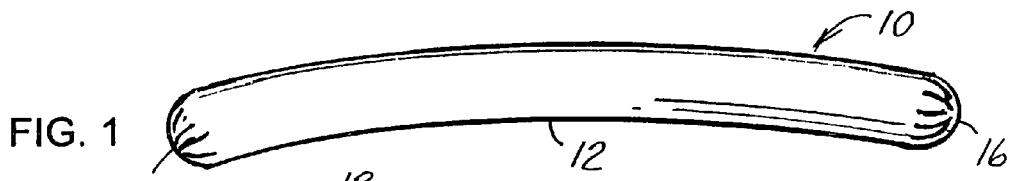
FIG. 1 is a side view of a conventional sausage-like food product to which principals of the present invention are to be applied.

While the present invention is susceptible of embodiment in multiple forms, there is shown in the drawings and will hereinafter be described preferred embodiments of the invention, with the understanding the present disclosure is to be considered as setting forth exemplifications of the invention which are not intended to limit the invention to the specific embodiment illustrated and described.

As used herein and throughout, the phrase "edible sausage-like food product" means and refers to an elongated and generally cylindrical food product commonly referred to as Italian and/or Polish and/or otherwise named sausage, bratwurst, wiener, frankfurter, hot dog and the like which may or may not include an outer casing of plastic or similar non-toxic material. The edible sausage-like food product is typically comprised of one or more, or a combination of the following: beef, pork, turkey, soy, and/or vegetable.

In the drawings, wherein like reference numerals indicate like elements throughout the several views, a conventional edible sausage-like food product is shown in FIG. 1 and is designated generally by reference numeral 10. As shown, the cooked edible sausage-like food product 10 has an elongated cylindrically shaped exterior 12 having first and second longitudinally spaced end portions 14 and 16, respectively, defining a length of the food product 10 therebetween.

Figure 2:
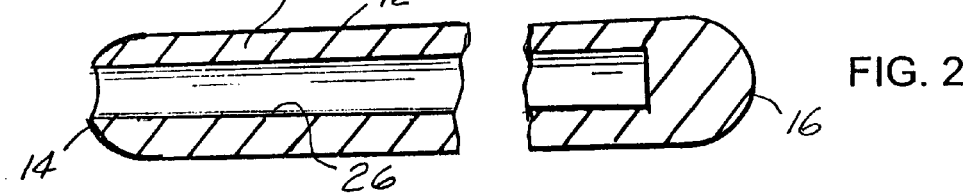
FIG. 2 is a fragmentary and enlarged longitudinal sectional view of the sausage-like food product shown in FIG. 1 having a Step in the process according to the present invention having been applied thereto.

As shown in FIG. 2, an interior of the food product 10 includes a main body 18 extending the length of the food product and which is comprised of: beef, pork, turkey, soy, vegetable or any of a combination of these ingredients. As is known, each ingredient comprising the main body 18 provides a specific and generally known flavor to the product 10. The food product 10 heretofore described is generally well known in the art.

Figure 3:
FIG. 3 is a fragmentary side elevational view of an inner core removed from the sausage-like food product.
Figure 8:
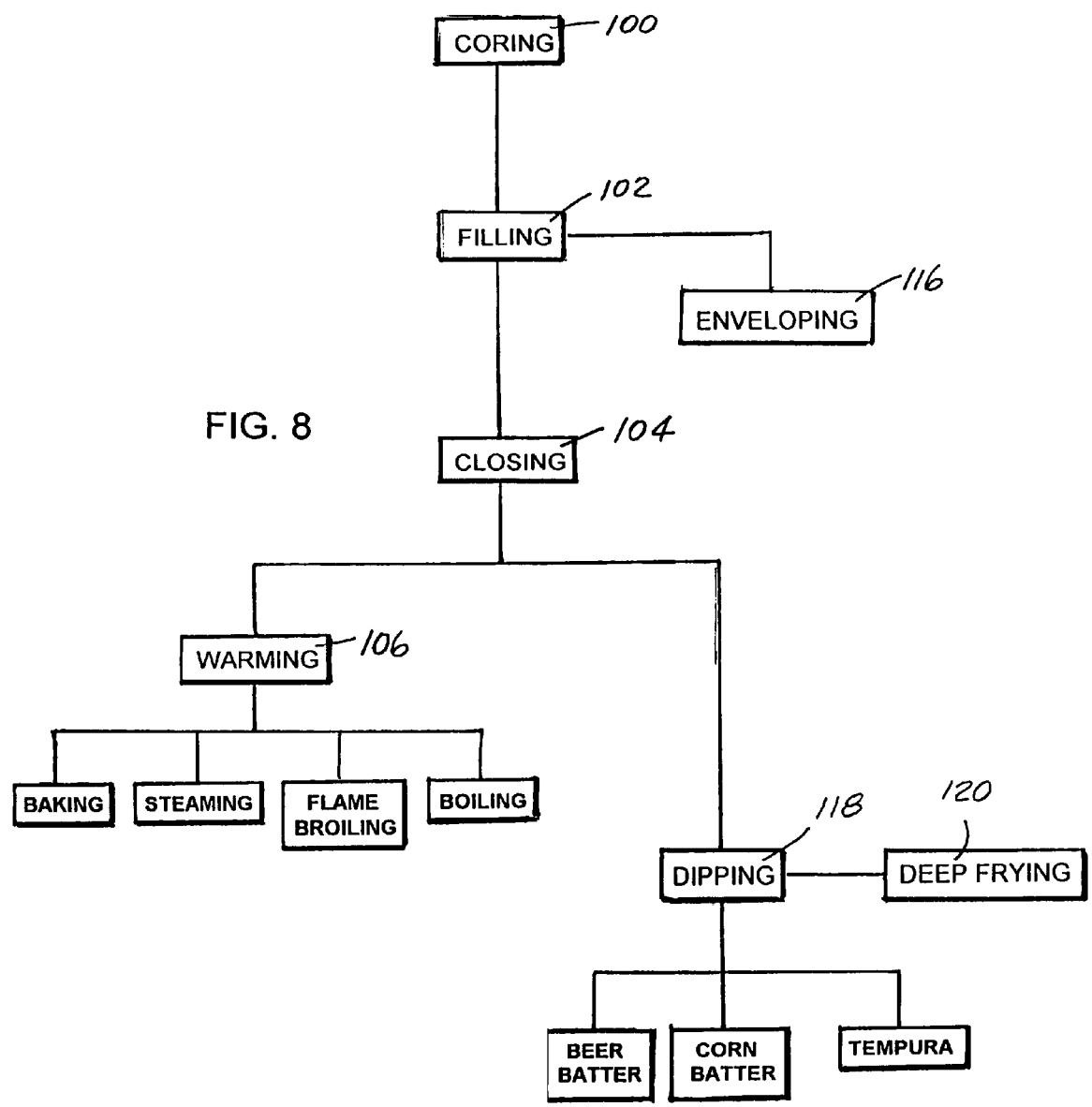
FIG. 8 is a schematic view of the process or methodology of the present invention.

The process or method for producing a food product, schematically shown in FIG. 8, begins with a well known conventional and edible sausage-like food product 10. As shown in FIG. 8, the process begins at Step 100. At Step 100 of the process or method, an elongated inner core 20 of material (FIG. 3) is removed from the main body 18 of the conventional sausage 10. Any conventional and well known coring apparatus can be used to remove the inner core 20 (FIG. 3), preferably in an elongated one-piece configuration, from the main body 18 of sausage 10. As such, the material 20 removed from the main body 18 comprises the same food product material as the main body 18 of the remaining food product 10. Preferably, and as shown in FIG. 3, the material 20 removed from the main body 18 is in the form of an elongated plug 22 which is placed in a suitable storage container (not shown) from whence it can be removed and used in a manner described below.

It is important to note, and as shown in FIG. 2, after the plug 22 (FIG. 3) is removed from the main body 18, a blind bore 26 is defined by the main body 18 of the sausage product 10. That is, the bore 26 created in the main body 18, after the core 22 is removed therefrom, does not extend entirely through the sausage. Instead, the bore 26 is closed at one end and extends for a major length of the sausage 10. That is, the blind bore 26 extends for a distance ranging between about 60% to about 90% of the overall length of the elongated sausage or food product. The other end of the blind bore 26 opens to the exterior 12 of the food product 10. In one form, the blind bore 26 opens to one end portion 14, 16 of sausage 10. In a preferred form, the blind bore 26 extends coaxial with the main body 18 of the food product or sausage.

Figure 4:
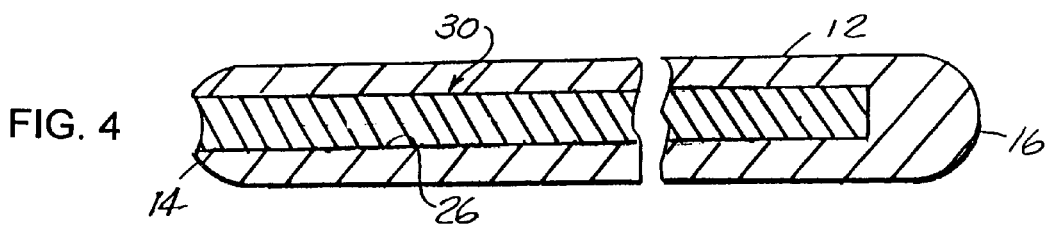
FIG. 4 is a view similar to FIG. 2 showing the sausage-like food product after a specialty filling or foodstuff has been added thereto.

At Step 102 of the process or method, a mass of edible material or specialty filling of suitable consistency, and generally indicated in FIG. 4 by reference numeral 30, is inserted into the open end of the blind bore 26. The mass of edible material or specialty filling can be inserted in an suitable manner, i.e., by hand, or, alternatively, as by injection into the blind bore 26 by a suitable tube (not shown) or the like. As shown in FIG. 4, the edible material or filling 30 continues to be inserted into the bore 26 until such mass of edible material 30 substantially fills the length of the bore 26.

The specialty filling or mass of edible material 30 inserted into the blind bore 20 defined by the food product 10 is comprised of any one or more of the following materials: pork; beef; turkey; bacon; flavored Italian sausage; bread crumbs; water; pepperoni; chili; beans; cheese, tomato; onion, sour kraut; relish; pickle; cucumber; mushroom; olive; avocado; lettuce; potato; ketchup; mustard; mayonnaise; flavored sauce; seafood; egg; cream cheese; salsa; pepper; pineapple; raisin; apple; flavored nuts; spices; and, like ingredients.

Figure 5:
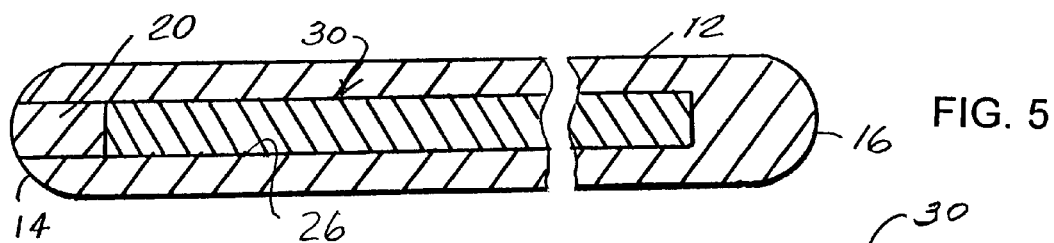
FIG. 5 is a view similar to FIG. 4 showing the sausage-like food product after principals of the present invention have been applied thereto.

At Step 104 of the process or method, and as shown in FIG. 5, the open end of the blind bore 26 is closed by inserting a plug into and thereby filling a lengthwise portion of the open end of the blind bore in the meat sausage. The plug inserted into the open end of the meat sausage is made from a lengthwise section or portion of the inner core material 290 removed from the main body 18 of the sausage 10 or from a previously cored sausage. Since the closure plug inserted into the open end of the bore 26 is taken from the inner core or plug 20, it comprises the same material as the remainder of the main body 18 of the product. At the completion of Step 104, an edible sausage-like food product offering a variety of different or multistaged flavors is provided for consumption. The edible sausage-like food product thus created can be served or suitably stored in a frozen condition until it is prepared to be served or eaten.

The process or methodology for producing an edible sausage-like food product preferably also includes Step 106. Step 106 involves warming or cooking the edible sausage-like product with the inner bore 26 filled with a mass of edible material or specialty filling. As shown in FIG. 8, the warming or cooking at Step 106 is accomplished using at least one of the following: baking; steaming; flame broiling; and, boiling. As will be appreciated, during the cooking or warming Step 106, the flavors of the mass of edible material or specialty filling 30 will distribute through the main body 18 and, thus, enhance the edibility thereof.

Figure 6:
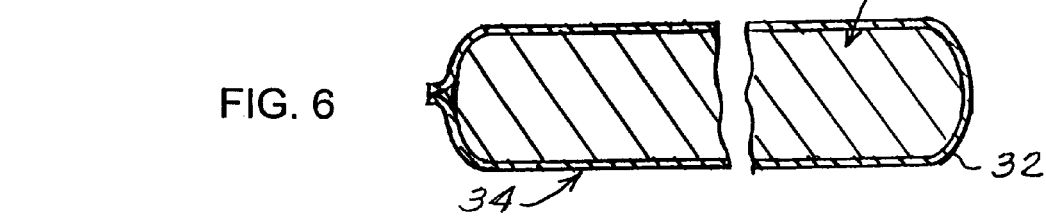
FIG. 6 is a fragmentary and enlarged longitudinal sectional view of a prepackaged specialty filling or foodstuff packet which can be used in combination with the present invention.

A variation of the above methodology or process can furthermore involve the inclusion of Step 116. As shown in FIG. 6, Step 116 involves extruding the mass of edible material or specialty fillings 30 into an edible and flexible meat/vegetable outer casing 32 to form a specialty filling packet 34. Suffice it to say, casing 32 wholly encloses and maintains the flavoring of the specialty fillings therewithin prior to insertion of such packet 34 into the blind bore 26 (FIGS. 2 and 4) defined by the sausage-like food product.

Figure 7:
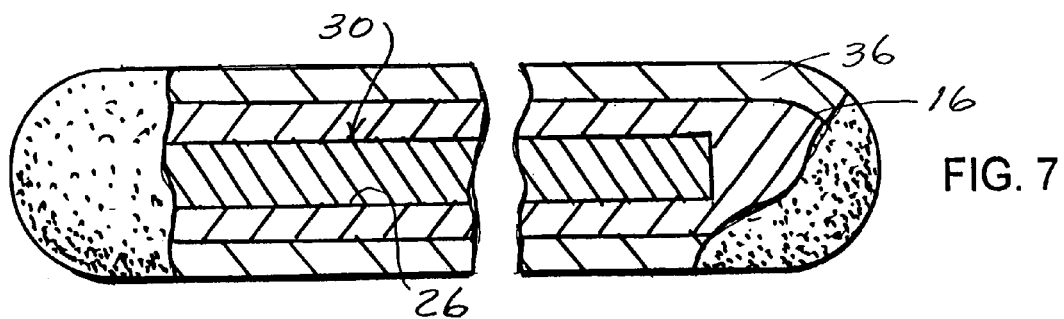
FIG. 7 shows an alternative embodiment of a sausage-like food product after principals of the present invention have been applied thereto.

Another variation of the above methodology or process can involve the inclusion of Step 118. Step 118 involves dipping the sausage-like food product, with the filled and closed or plugged blind bore 26, in a conventional batter whereby covering at least a lengthwise portion of the exterior 12 of the sausage-like product (see FIG. 7). As shown schematically in FIG. 8, the batter into which the sausage-like food product is dipped consists of at least one of the following: corn batter; beer batter; and, tempura.

At Step 120, and after dipping the sausage-like food product, with the filled and closed or plugged blind bore 26, in a batter (Step 118), the batter dipped sausage-like product can then be deep fried to add still another taste or flavor to the sausage-like product.

With the present invention, any of a series of thematical-like sausages can be created. That is, and depending upon the speciality filling 30 provided in operable association with the sausage-like product, a "Chili" type sausage-like product can be marketed and sold, or a "Philly" type sausage-like product can be marketed and sold. Alternatively, a "Greek" type sausage-like product along with a myriad of others can be marketed and sold. It should be appreciated, the variations of the "theme" for such sausage-like products is limited only by the numerous variations of the specialty fillings 30 which can be added to the sausage-like product created by the present invention.

Besides having the flavoring of the edible mass of material 30 permeate the main body 18 of the sausage-like product during the warming or cooking process, the contents of the edible material 30 is confined within the main body 18 of the sausage-like product. Thus, the product created by the present invention is easier to eat without such condiments falling off or running during handling of the sausage-like product. Moreover, by having the edible mass of material or specialty filling 30 extending the major length of the sausage-like product, multistaged flavorings extend along the major length of the sausage-like product From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. A method for producing an edible and elongated sausage-like meat product having opposed ends, comprising the steps of:

removing an inner meat core from said elongated meat sausage, with the inner meat core removed from said elongated meat sausage having a length less than a distance between the opposed ends of said sausage such that, after said inner meat core is removed therefrom, said meat sausage defines a blind bore extending generally coaxial with and along a major length of said sausage, with said blind bore opening to one end of said sausage;

inserting a mass of edible material into the open end of said blind bore in said meat sausage until said mass of edible material substantially fills the length of said blind bore, and with the meat at a closed end of said blind bore preventing said edible material from leaking from said sausage; and inserting a plug into and thereby filling a lengthwise portion of the open end of said blind bore in said meat sausage, with said plug being made from a lengthwise portion of the inner meat core removed from said meat sausage or from an inner core of a previously cored meat sausage.

2. The method for producing an edible meat product according to claim 1, further including the step of: warming the edible meat product whose inner core is filled with said mass of edible material.

3. The method for producing an edible meat product according to claim 2, wherein the step of warming the edible meat product is effected using at least one of the following steps: baking; steaming; deep frying; flame broiling; and, boiling.

4. The method for producing an edible meat product according to claim 1, wherein said mass of edible material inserted into the blind bore defined by said elongated sausage is comprised of any one or more of the following foodstuffs: pork; beef; turkey; bacon; flavored Italian sausage; bread crumbs; water; ham; pepperoni; chili; beans; cheese; tomato; onion; sour kraut; relish; pickle; cucumber; mushroom; olive; avocado; lettuce; potato; ketchup; mustard; mayonnaise; flavored sauce; seafood; egg; cream cheese; salsa; pepper; pineapple; raisin; apple; flavored nuts; and, spices.

5. The method for producing an edible meat product according to claim 4, further including the step of: extruding said mass of edible material into an edible and flexible outer meat/vegetable casing which wholly encases and maintains the flavoring of said mass of edible material therewithin prior to insertion of said mass of edible material into the blind bore defined by said sausage.

6. A method for producing an edible product in the form of an elongated sausage having first and second ends, said method comprising the steps of:
removing sausage material from between the first and second ends of said elongated sausage such that, after said sausage material is removed therefrom, said sausage defines a blind bore extending along a major length of said sausage, with said blind bore opening to one end of said elongated sausage;
inserting a specialty filling into the open end of said blind bore in said meat sausage until said specialty filling substantially fills the length of said blind bore, and with sausage material at a closed end of said blind bore preventing leaking of said specialty filling from said sausage; and
inserting a plug into and thereby filling a lengthwise portion of the open end of said blind bore in said sausage, with said plug being made from a lengthwise portion of the sausage material removed from said sausage or from sausage material removed from another sausage.

7. The method for producing an edible product according to claim 6, wherein the blind bore defined by said elongated sausage extends for a distance ranging between about 60% and about 90% of a length measured between the first and second ends of said elongated sausage.

8. The method for producing an edible product according to claim 6, wherein said method further includes the step of: warming the elongated sausage filled with said specialty filling.

9. The method for producing an edible product according to claim 8, wherein the step of warming the edible meat product is effected using at least one of the following steps: baking; steaming; deep frying; flame broiling; and, boiling.

10. The method for producing an edible product according to claim 6, wherein said specialty filling inserted into the blind bore defined by said elongated sausage is comprised of any one or more of the following materials: pork; beef; turkey; bacon; flavored Italian sausage; ham; pepperoni; chili; beans; cheese; tomato; onion, sour kraut; relish; pickle; cucumber; mushroom; olive; avocado; lettuce; potato; ketchup; mustard; mayonnaise; flavored sauce; seafood; egg; cream cheese; salsa; pepper; pineapple; raisin; apple; flavored nuts; and, spices.

11. The method for producing an edible product according to claim 10, further including the step of: extruding said specialty filling into a casing which wholly encloses and maintains the flavoring of said specialty filling therewithin prior to insertion of said specialty filling into the blind bore defined by said sausage.

12. A method for producing an edible meat product in the form of an elongated sausage, comprising the steps of:
removing an inner meat core from between first and second ends of said elongated meat sausage, with the inner meat core removed from said elongated meat sausage having a length less than a distance between the first and second ends of said sausage such that, after said inner meat core is removed therefrom, said meat sausage defines a blind bore extending along a major length of said sausage, with said blind bore opening at one end to an exterior of said elongated sausage;
inserting a mass of edible material into the open end of said blind bore in said meat sausage until said mass of edible material substantially fills the length of said blind bore, and with sausage meat at the closed end of said blind bore preventing said edible material from leaking from the closed end of said sausage;
inserting a plug into and thereby filling a lengthwise portion of the open end of said blind bore in said meat sausage, with said plug being made from a lengthwise portion of the inner meat core removed from said meat sausage or from an inner core of a previously cored meat sausage; and
dipping said sausage, with said filled and closed blind bore, in a batter whereby covering at least a lengthwise portion of the exterior of said sausage; and
deep frying said batter dipped sausage.

13. The method for producing an edible meat product according to claim 12, wherein said mass of edible material inserted into the blind bore defined by said elongated sausage is comprised of any one or more of the following foodstuffs: pork; beef; turkey; bacon; flavored Italian sausage; bread crumbs; water; ham; pepperoni; chili; beans; cheese; tomato; onion, sour kraut; relish; pickle; cucumber; mushroom; olive; avocado; lettuce; potato; ketchup; mustard; mayonnaise; flavored sauce; seafood; egg; cream cheese; salsa; pepper; pineapple; raisin; apple; flavored nuts; and, spices.

14. The method for producing an edible meat product according to claim 12, further including the step of: extruding said mass of edible material into an edible and flexible outer meat/vegetable casing which wholly encloses and maintains the flavoring of said mass of edible material therewithin prior to insertion of said mass of edible material into the blind bore defined by said sausage.

15. The method for producing an edible meat product according to claim 12, wherein the batter into which said sausage is dipped consists of at least one of the following: corn batter; beer batter, and tempura.

* * * * *